ROBERT W. MINCK
INVENTOR.

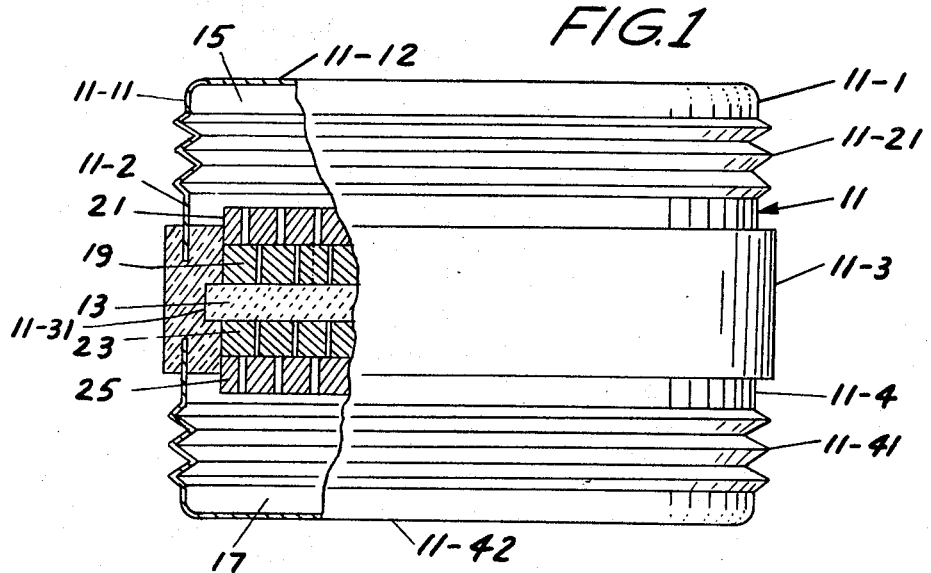
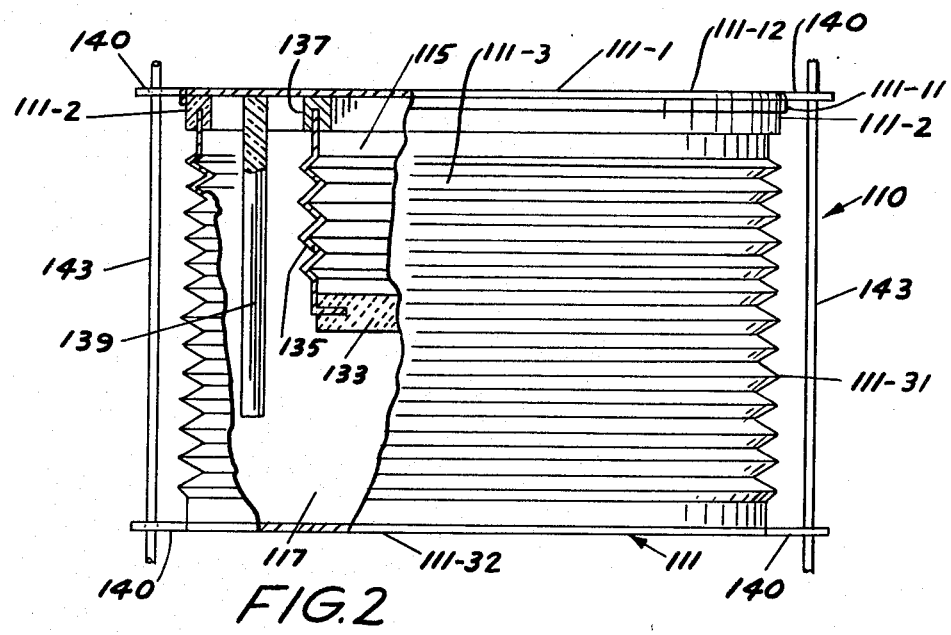

BY John R. Faulkner
Olin B. Johnson

ATTORNEYS

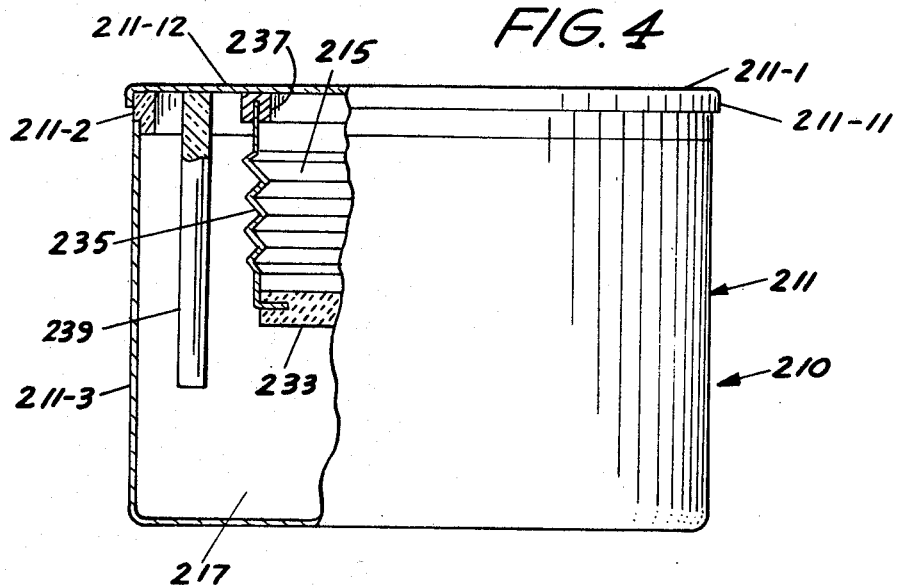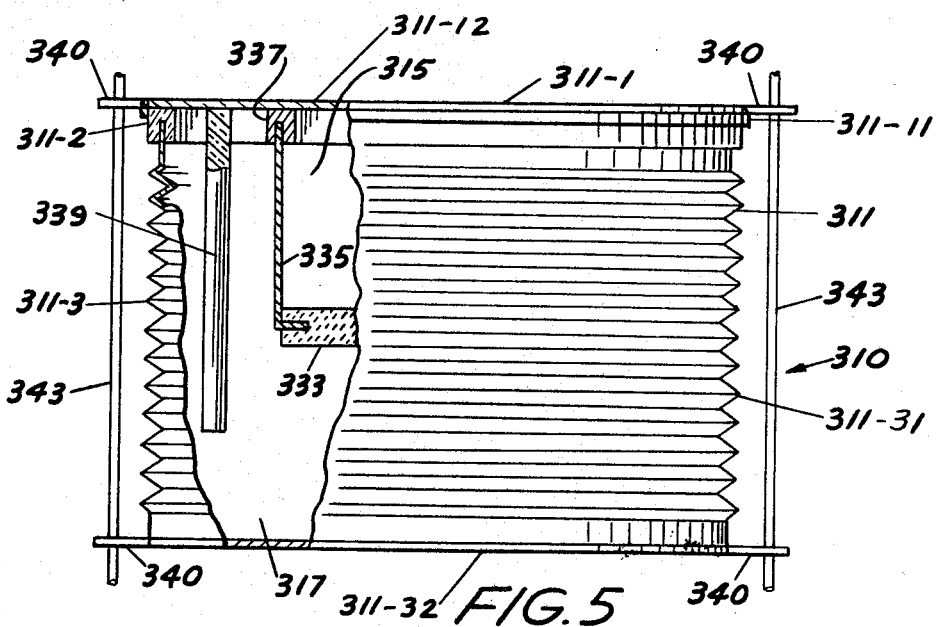

United States Patent Office 3,514,332
Patented May 26, 1970

3,514,332
SECONDARY BATTERY WITH ALKALI-SULFUR ELECTRODES AND MOVABLE SOLID ELECTROLYTE
Robert W. Minck, Lathrup Village, Mich., assignor to Ford Motor Company, Dearborn, Mich., a corporation of Delaware
Filed Apr. 3, 1967, Ser. No. 628,026
Int. Cl. H01m 35/00
U.S. Cl. 136—6                                    5 Claims

ABSTRACT OF THE DISCLOSURE

An electrically-rechargeable, secondary battery comprising cells in series electrical connection, a unit cell of said battery comprising a closeable cell housing which when closed forms an internal compartment and has oppositely disposed, electronically-conductive, rigid, wall surfaces electronically insulated from each other which respectively serve as anode and cathode of the cells, an electronically-insulative, cationically-conductive, solid electrolyte interposed between said anode and said cathode, dividing said compartment into an anodic reaction zone and a cathodic reaction zone, and separating the anodic half-cell reactions of said reaction zone from the cathodic half-cell reactions, said solid electrolyte being movable in relation to at least one electrode of the cell when the cell housing is closed and said anodic reaction zone and said cathodic reaction zone are charged with their respective reactants through motion of an axially collapsible and expandable wall member interposed between said anode and said cathode, an alkali metal within said anodic reaction compartment, in contact with said solid electrolyte and in electrical connection with said anode, and within said cathodic reaction zone, in contact with said solid electrolyte, and in electrical connection with said cathode, a sulfur-comprising cathodic reactant-electrolyte that is electrochemically reversibly reactive with ions of said alkali metal; and the aforedescribed cell.

---

This invention relates to high energy density batteries which employ a molten alkali metal as the anodic reactant and to their construction and operation. In particular, this invention is concerned with improvements in batteries the cell or cells of which employ a molten alkali metal anodic reactant and a sulfur-comprising cathodic reactant-electrolyte that is electrochemically reversibly reactive with cations of the alkali metal. Batteries and/or cells of this type are described in the copending U.S. patent applications of Joseph T. Kummer and Neill Weber, Ser. Nos. 507,624, now U.S. Pat. 3,404,035; Ser. No. 563,938, now U.S. Pat. 3,404,036 and Ser. No 582,608, now U.S. Pat. 3,413,150; and the copending U.S. patent application Ser. No. 604,100 of Matthew A. Dzieciuch and Neill Weber, the disclosures of which are incorporated herein by reference.

This type of cell is separated into an anodic reaction zone and a cathodic reaction zone by a solid electrolyte, preferably a crsytalline object or membrane that is selectively conductive to cations of the alkali metal anode-reactant and essentially impermeable to other contents of these zones, e.g. the anodic reactant in elemental form, anions of the cathodic reactant and the cathodic reactant in elemental or compound form. Suitable solid electrolyte for use in the instant invention, their properties and preparation are described in detail in the aforementioned patent applications and examples thereof are hereinafter recited.

In the discharge half cycle of the cell, the alkali metal anodic reactant, e.g. sodium, releases electrons to the anode and thence to the external circuit with resultant formation of cations in the anodic reaction compartment. Sulfur atoms in the cathodic reaction zone accept electrons from the cathode and said external circuit forming anions. The positively charged alkali metal ions are attracted to the cathodic reaction zone and pass through the cationically-conductive solid electrolyte to associate with the negatively charged sulfur ions. In the charging half cycle, the current is reversed by application of an external electrical power source and the alkali metal ions are driven back through the solid electrolyte into the anodic reaction zone.

This invention relates to improvements in batteries and/or cells of the type hereinbefore described which have as their objectives minimizing cell volume per unit output of electrical energy, providing more effective cell operation when feeder plates are not employed, minimizing internal impedance in such cells, and providing accurate indicator means for monitoring degrees of charging and discharging.

This invention will be more fully understood by a study of the accompanying drawings in conjunction with the following detailed description:

FIG. 1 is a side view of one embodiment of a cell constructed in accordance with this invention with a portion of the exterior housing removed to reveal internal construction;

FIG. 2 is a side view of a second embodiment of a cell constructed in accordance with this invention with a portion of the exterior housing removed to reveal internal construction and having female guide members in sliding engagement with locating means;

FIG. 4 is a side view of a third embodiment of a cell constructed in accordance with this invention with a portion of the exterior housing removed to reveal internal construction;

FIG. 5 is a side view of a fourth embodiment of a cell constructed in accordance with this invention with a portion of the exterior housing removed to reveal internal construction and having male guide members in sliding engagement with locating means;

Figure 7:
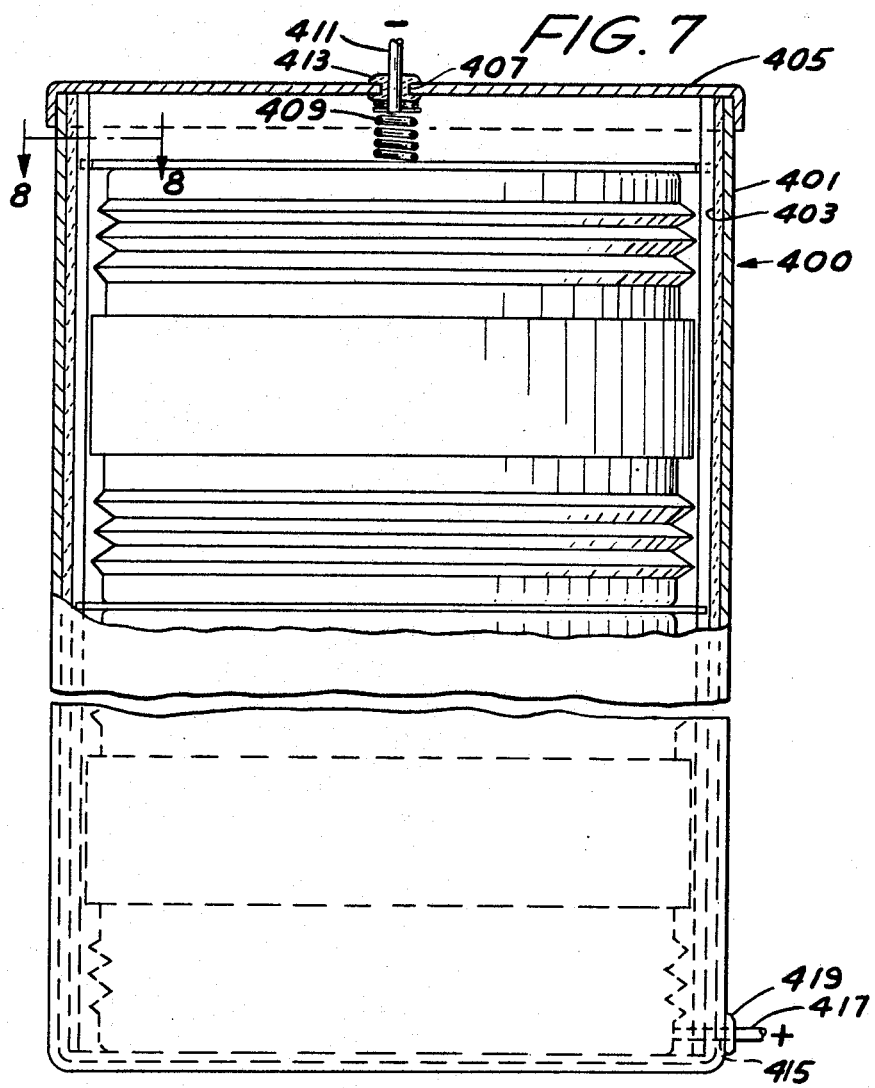
Figure 8:
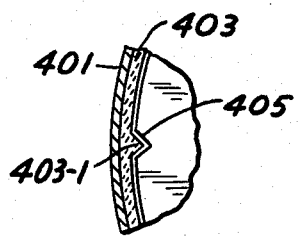

FIG. 7 is a side view of one embodiment of a battery of this invention with a portion of the exterior housing removed to reveal a plurality of cells therein in series electrical connection; and FIG. 8 is a sectional view of a portion of the battery of FIG. 7 taken along line 8—8 revealing another embodiment of locating means for positioning individual cells in the cell retaining means of the battery.

Referring now to FIGS. 1 and 2, there is shown a cell 10 having a closeable cell housing 11. Cell housing 11 comprises a cell cover 11–1 having a circumferential flange 11–11 and an essentially planar, rigid, top plate or anode 11–12, a first, axially collapsible and expandable, wall member or upper bellows 11–2 having a plurality of folds or accordian pleats 11–21, a circumferential insulator, seal and support member 11–3, and a second, axially collapsible and expandable, wall member or lower bellows 11–4 having a plurality of pleats 11–41, and an essentially planar, rigid, bottom plate or cathode 11–42. Plate member 13, a cationically-conductive, polycrystalline solid electrolyte, divides the interior of housing 11 into an anodic reaction zone 15 and a cathodic reaction zone 17. Plate 13 is essentially electronically nonconductive.

Cell cover 11–1, upper bellows 11–2 and lower bellows 11–4 are formed of one or more metals or alloys that are chemically resistant to the reactants and reaction products making contact therewith. Anode 11–12 and cathode 11–42 must be good electrical conductors. The upper bellows 11–2 and the lower bellows 11–4 are preferably good electrical conductors but need not be if other means of electrical conduction are provided between solid electrolyte 13 and each of the aforementioned electrodes. In this embodiment, cell cover 11–1, upper bellows 11–2, and lower bellows 11–4 are formed of aluminum coated steel. Cell cover 11–1 is constructed and arranged to be affixed to upper bellows 11–2 so as to provide a liquid and gas-tight seal by closure means not shown, e.g. clamping means.

Plate 13 may be a polycrystalline object formed by sintering crystals consisting essentially of a structural lattice and sodium ions which are mobile in relation to such lattice under influence of an electric field. The structural lattice consists essentially of a major proportion by weight of ions of aluminum and oxygen and a minor proportion by weight of a metal having a valence not greater than 2 in crystal lattice combination, e.g. lithium or magnesium. In this embodiment, plate 13 is prepared in the following manner.

(1) In powdered form $Na_2CO_3$, $LiNO_3$, $Al_2O_3$ were added to a vessel and mechanically mixed for 30 minutes. The $Al_2O_3$ employed was in the form of 0.05 micron particles. The weight percent of the individual oxides employed were $Li_2O$—0.99, $Na_2O$—9.99 and $Al_2O_3$—89.02.

(2) The mix was heated at 1250° C. for one hour.

(3) The sample was mixed with a wax binder (Carbowax) and mechanically pressed into flat plates.

(4) The plates were then isostatically pressed at 90,000 p.s.i.

(5) The wax binder was removed by slowly heating the plates to about 550° C.

(6) The plates were sintered in an electric furnace at 1460° C. During sintering, the plates were kept in a covered crucible in the presence of packing powder of the same composition as said mix.

In this embodiment, solid electrolyte 13 is a circular plate which fits within slot 11–31 of glass support member 11–3 with which a liquid and gas-tight glass seal is effected. Support member 11–3 may also be formed of a suitable refractory material that has a coefficient of expansion essentially the same as that of plate 13 and is resistant to temperatures of at least about 300° C. and to chemical attack by the reactants contacted.

Positioned in contact with and immediately above plate 13 in anodic reaction zone 15 is a porous metal plate 19. Advantageously, a substantial portion of the pores in plate 19 are of a size within the capillary range. In this embodiment, plate 19 is steel and has an average pore diameter of about 20–30 microns. Immediately above and in contact with plate 19 is a second porous steel plate or grid 21 having a substantially larger average pore diameter, advantageously at least twice as large as the average pore diameter of plate 19. In this embodiment, a substantial number of the pores of plate 21 have an average pore diameter in the range of about 100–200 microns. These plates serve as feeder means providing an even distribution of the alkali metal to the surface of plate 13 facing zone 15. They also serve as safety means by preventing a too rapid mixing of the alkali metal with the sulfur-comprising, cathodic reactant-electrolyte in the event plate 13 is broken in use. Porous metal plates are well known in the art and can be prepared with a wide range of porosity characteristics. See, for example, Porous Powder Metallurgical Products, R. Bishop and G. M. Collins, in Chemical Engineering Practice, vol. 2 at pp. 464–482, 1956, Academic Press, New York, and Forms and Properties of Porous Metal Products, H. Mourven and T. R. Fruda in Progress in Powder Metallurgy, vol. 18 at pp. 166–171, 1962, Capitol City Press, Montpelier, Vt.

Anodic reaction zone 15 is filled with molten sodium to a height above the upper surface of plate 21. Plates 19 and 21 are held in place by conventional positioning means, not shown. These may take the form of conductive springs positioned between anode 11–12 and plate 13 or they may be attached to support member 11–3. Unless a metal having essentially the same coefficient of expansion as that of plate 13 is chosen, e.g. an iron-nickel alloy containing about 41 percent nickel, the attachment should be such as to admit of dimensional changes in the metal incidental to temperature change. Plates 19 and 21 should be of a metal readily wetted by the alkali metal.

Positioned immediately below plate 13 is porous plate 23 and immediately below that porous plate 25. Plate 23 has substantially smaller pores than plate 25 in the manner of plates 19 and 21. Plates 23 and 25 are preferably formed of an electrically conductive material. In this embodiment, plates 23 and 25 are porous carbon plates having pores averaging about 20 to about 30 microns and about 100 to about 200 microns respectively. Porous carbon plates having a wide variety of pore sizes are commercially available. Such plates are prepared by a variety of methods, e.g. admixing finely divided carbon with an organic binder, compressing the mix into the desired shape under high pressures and heating the resultant compressate in a controlled atmosphere such as carbon dioxide until the desired porosity is obtained. In certain embodiments, it may be advantageous to reinforce the carbon plates or to prepare them in sections with flexible or resilient separators interposed therebetween. Plates 23 and 25 should be of a material that is readily wetted by the sulfur or sulfur-comprising reactant which partially fills the cathodic reaction zone 17 contacting the lowermost plate and thence rising through the pores of the two plates to contact the ceramic plate 13. These plates serve as feeder means in distributing an even supply of sulfur to the surface of plate 13 facing into zone 17. In conjunction with plates 19 and 21 these plates serve to prevent rapid mixing of reactants if plate 13 is broken. Cathodic reaction zone 17 contains sulfur or a sodium and sulfur-comprising oxidant in those embodiments employing sodium as the alkali metal reactant, e.g. $Na_2S_5$. The cathodic reactant may contain finely divided carbon to provide conduction until sodium ions have migrated through plate 13. Plates 23 and 25 are held in position against plate 13 in the same manner as plates 19 and 21.

Referring now to FIG. 2, there is shown another cell embodiment wherein both the exterior cell walls and the walls of the upper reaction zone are axially collapsible and expandable. Cell 110 has a closeable cell housing 111. Cell housing 111 comprises a cell cover 111–1 having a circumferential flange 111–11 and an essentially planar, rigid, top plate or cathode 111–12, a glass insulator ring and sealing means 111–2, and an axially collapsible and expandable, wall member or bellows 111–3 having a plurality of folds or pleats 111–31, and a bottom plate or anode 111–32. Plate member 133, axially collapsible and expandable wall member or bellows 135 and support ring 137 divide the interior of housing 111 into a cathodic reaction zone 115 and an anodic reaction zone 117. Plate 133 is a cationically-conductive, polycrystalline solid electrolyte. Bellows 135 is schematically resistant to both the anodic and cathodic reactants and is sealed in gas-tight relationship with plate 133 and glass ring 137 with sealing glass. Ring 137 is bonded to cell cover 111–1 by welding or other sealing means. Bellows 135 is prevented from contacting bellows 111–3 by a glass shield 139. Shield 139 may be a plurality of glass posts positioned intermediate the two bellows encompassing bellows 135 or it may be a continuous glass ring. In this embodiment, it is preferred to locate the sulfur-comprising oxidant in zone 115. The sodium or other alkali metal reactant leaves its zone in ionic form in the discharge half cycle and such zone may be essentially depleted of this reactant. The increase of liquid volume in the ion-receiving cathodic reactant is not equal to the loss of liquid volume from the anodic reaction zone. Hence, a lesser dimensional change is effected in zone 115 in each half cycle with resultant less wear upon bellows 135 when zone 115 is employed as the cathodic reaction zone. Correspondingly, there is a greater dimensional change in zone 117 providing the maximum decrease obtainable in the overall volume of the cell at the end of the discharge cycle.

Figure 3:
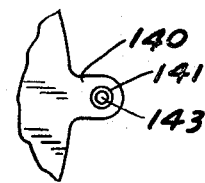
FIG. 3 is a top view of one of the female guide members and the corresponding locating means shown in FIG. 2.

Extending from anode 111–32 and cathode 111–12 are a plurality of female guide members 140, more fully shown in FIG. 3. These guide members have a circular aperture 141 in which they are in sliding engagement with rods 143, locating means of a cell retaining unit not further shown. Rods 143 are formed of or coated with a nonconductive material.

Referring now to FIG. 4, there is shown another cell embodiment wherein the exterior cell walls are rigid while the walls of the upper reaction zone are axially collapsible and expandable. Cell 210 has a closeable cell housing 211. Cell housing 211 comprises a cell cover 211–1 having a circumferential flange 211–11 and an essentially planar, rigid, top plane or anode 211–12, a glass insulator ring and sealing means 211–2, and a rigid wall member 211–3 which has an essentially planar bottom and serves as the cathode of the cell. Plate 233, an axially collapsible and expandable, wall member or bellows 235 and support ring 237 divide the interior compartment formed by housing 211 into an anodic reaction zone 215 and cathodic reaction zone 217. These zones may be reversed in this embodiment but the arrangement described is preferred there being no overall dimensional change in the cell and it is easier to maintain contact between the alkali metal and the separator plate with this arrangement. Bellows 235 is prevented from contacting wall member 211–3 by a glass shield 239. Shield 239 may be a plurality of posts of nonconductive material encompassing bellows 235 or a continuous ring.

Referring now to FIG. 5, there is shown another cell embodiment characterized in having exterior walls that are axially collapsible and expandable while the walls of the upper reaction zone are rigid. Cell 310 has a closeable cell housing 311. Cell housing 311 comprises a cell cover 311–1 having a circumferential flange 311–11 and an essentially planar, rigid, top plate or anode 311–12, a glass insulator ring and sealing means 311–2, an axially collapsible and expandable wall member or bellows 311–3, and an essentialy planar bottom plate or cathode 311–32 which contacts the next adjacent cell. Plate 333, rigid wall member 335, and support ring 337 divide the interior compartment formed by housing 311 into an anodic reaction zone 315 and a cathodic reaction zone 317. Bellows 311–3 are prevented from contacting wall member 335 by a glass shield 339. As in the previously described embodiments, shield 339 may be a plurality of glass posts or a continuous glass ring.

Figure 6:
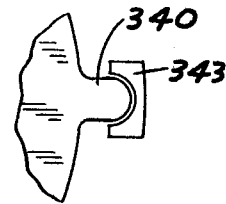
FIG. 6 is a top view of one of the male guide members and the corresponding locating means shown in FIG. 2.

Extending from anode 311–12 and bottom plate 331–32 of cathode 311–3 are a plurality of male guide members 340, more fully shown in FIG. 6. Guide members 340 are in sliding engagement with U-shaped members 343, locating means of a cell retaining unit not further shown. The U-shaped members 343 are formed of or coated with a nonconductive material.

It will be understood by those skilled in the art that alternate feeder plates such as those shown in FIG. 1, alternate conduction means between electrodes and solid electrolyte, etc., may be employed with the embodiments represented by FIGS. 2–5 inclusive.

Referring now to FIG. 7, there is shown a battery 400 comprising a plurality of cells vertically stacked in series electrical connection within a cylindrical container 401. Container 401 has a liner 403 formed of a suitable nonconductor, e.g. mica, glass, vitreous material, etc., and a cover 405.

Through an aperture 407 in cover 405 electrical connection is provided between the top surface, in this arrangement the anode, of the upper cell and an external circuit via spring conductor 409 and conductor 411. Conductor 411 is supported in aperture 407 by a nonconductive, preferably resilient, stopper or sleeve 413, e.g. glass, mica or a glass or mica centrally-lined, spring-comprising metal sleeve. Container 401 has an aperture 415 through which electrical connection is provided between the lower surface of the bottom cell, in this arrangement the cathode, and said electrical circuit via conductor 417. Conductor 417 is supported in aperture 415 by a nonconductive stopper or sleeve 419.

In this embodiment, liner 403 is provided with a plurality of male members 403–1, one of which is shown in FIG. 8. In this embodiment, the cell electrode plates are each provided with a corresponding number of peripheral notches or female locating means 405. It will be understood by those skilled in the art that two or more of such batteries as shown in FIG. 7 may be connected in series and/or parallel to provide the desired output of electrical energy. It will also be understood that because of the use of the axially collapsible and expandable wall members of the cells hereinbefore described, such cells may be stacked horizontally. In horizontal arrangement, spring means may be employed to facilitate cell contraction and thus maintain contact of reactants and solid electrolyte.

This cell can be assembled at room temperature and later heated to operating temperature, a temperature at least sufficient to maintain both the anodic reactant and the cathodic reactant in molten state.

As heating means do not comprise a part of this invention, no specific heating means is shown herein. However, it will be understood by those skilled in the art that either external or internal heating means may be used. If internal heating means are employed, suitable sealed inlet and outlet means can be provided in the cell housing. It will also be understood that the cell, the retaining unit for a plurality of cells, or both, may be designed to provide for internal or external cooling.

This invention is not limited to the examples herein shown and described. Changes and modifications may be made within the spirit and scope of the invention as defined in the appended claims.

What is claimed is:

1. An electrically rechargeable cell for generating electrical energy electrochemically comprising cell housing which when closed forms an internal compartment and has oppositely disposed, electronically-conductive, electrodes forming wall surfaces which are electronically insulated from each other and serve as the anode and cathode of said cell, a solid electrolyte interposed between said anode and said cathode and between an anodic reaction zone extending between said solid electrolyte and said anode and a cathodic reaction zone extending between said solid electrolyte and said cathode, and an axially collapsible and expandable wall member fixedly secured to one of said electrodes which in cooperation with this electrode and said solid electrolyte encloses one of said reaction zones and admits of expansion of the reaction zone which it partially encloses when the opposing reaction zone is being depleted of reactant by cation transfer from said opposing reaction zone into the reaction zone which it partially encloses and contraction when said cation transfer is reversed, an alkali metal within said anodic reaction zone in contact with said solid electrolyte and electrical connection with said anode, and within said cathodic reaction zone in contact with said solid electrolyte and in electrical connection with said cathode a sulfur-comprising cathodic reactant that is electrochemically reversibly reactive with ions of said alkali metal, said solid electrolyte being selectively conductive with respect the ions of said alkali metal, essentially impermeable to all other contents of said anodic reaction zone and said cathodic reaction zone, and, as a result of the expandability and contractability of said wall member, movable in relation to at least one electrode of said cell in a first direction by actuation of the discharge reaction of said cell and in a direction opposite said first direction by electrically recharging said cell.

2. A cell in accordance with claim 1 wherein said anodic reaction zone contains molten sodium and said cathodic reaction zone contains molten sulfur.

3. An electrically rechargeable cell for generating electrical energy electrochemically comprising a closeable cell housing which when closed forms an internal compartment and has oppositely disposed, electronically-conductive, electrodes forming wall surfaces which are electronically insulated from each other and serve as the anode and cathode of said cell, a solid electrolyte interposed between said anode and said cathode and between an anodic reaction zone extending between said solid electrolyte and said anode and a cathodic reaction zone extending between said solid electrolyte and said cathode, and an axially collapsible and expandable wall member fixedly secured to said anode which in cooperation with said anode and said solid electrolyte encloses said anodic reaction zone and admits of contraction of said anodic reaction zone in the discharge half cycle of said cell upon cationic transfer of anodic reactant from said anodic reaction zone through said solid electrolyte into said cathodic reaction zone and expansion in the charging half-cycle of said cell when said cationic transfer is reversed, an alkali metal within said aniodic reaction zone in contact with said solid electrolyte and in electrical connection with said anode, and within said cathodic reaction zone in contact with said solid electrolyte and in electrical connection with said cathode a sulfur-comprising cathodic reactant that is electrochemically reversibly reactive with ions of said alkali metal, said solid electrolyte being selectively conductive to ions of said alkali metal, essentially impermeable to all other contents of said anodic reaction zone and said cathodic reaction zone, and, as a result of the expandability and contractability of said wall member, movable in relation to said anode in a direction toward said anode by effecting the discharge reaction of said cell and in a direction away from said anode by electrically recharging said cell.

4. An electrically rechargeable cell for generating electrical energy electrochemically comprising a closeable cell housing which when closed forms an internal compartment and has oppositely disposed, electronically-conductive, electrodes forming wall surfaces which are electronically insulated from each other and serve as the anode and cathode of said cell, a solid electrolyte interposed between said anode and said cathode and between an anodic reaction zone extending between said solid electholyte and said anode and a cathodic reaction zone extending between said solid electrolyte and said cathode, and an axially collapsible and expandable wall member fixedly secured to said cathode which in cooperation with said cathode and said solid electrolyte encloses said cathodic reaction zone and admits of expansion of said cathodic reaction zone in the discharge half cycle of said cell upon cationic transfer of anodic reactant from said anodic reaction zone through said solid electrolyte into said cathodic reaction zone and expansion in the charging half-cycle of said cell when said cationic transfer is reversed, an alkali metal within said anodic reaction zone in contact with said solid electrolyte and in electrical connection with said anode, and within said cathodic reaction zone in contact with said solid electrolyte and in electrical connection with said cathode a sulfur-comprising cathodic reactant that is electrochemically reversibly reactive with ions of said alkali metal, said solid electrolyte being selectively conductive to ions of said alkali metal, essentially impermeable to all other contents of said anodic reaction zone and said cathodic reaction zone, and, as a result of the expandability and contractability of said wall member, movable in relation to said cathode in a direction away from said cathode by effecting the discharge reaction of said cell in a direction toward said cathode by electrically recharging said cell.

5. A rechargeable battery of cells for generating electrical energy electrochemically comprising in combination
   (1) cell retainer means constructed and arranged to retain a plurality of electrically rechargeable cells in a row in series electrical connection, and
   (2) a row of electrically rechargeable cells in accordance with claim 1 in series electrical connection within said cell retainer means.

References Cited

UNITED STATES PATENTS

| | | | |
|---|---|---|---|
| 3,238,437 | 3/1966 | Foster et al. | 136—83 |
| 3,245,836 | 4/1966 | Agruss | 136—83 |
| 3,404,035 | 10/1968 | Kummer et al. | 136—6 |
| 3,404,036 | 10/1968 | Kummer et al. | 136—6 |
| 3,413,150 | 11/1968 | Kummer et al. | 136—6 |

WINSTON A. DOUGLAS, Primary Examiner

C. F. LE FEVOUR, Assistant Examiner

U.S. Cl. X.R.

136—20